UNITED STATES PATENT OFFICE.

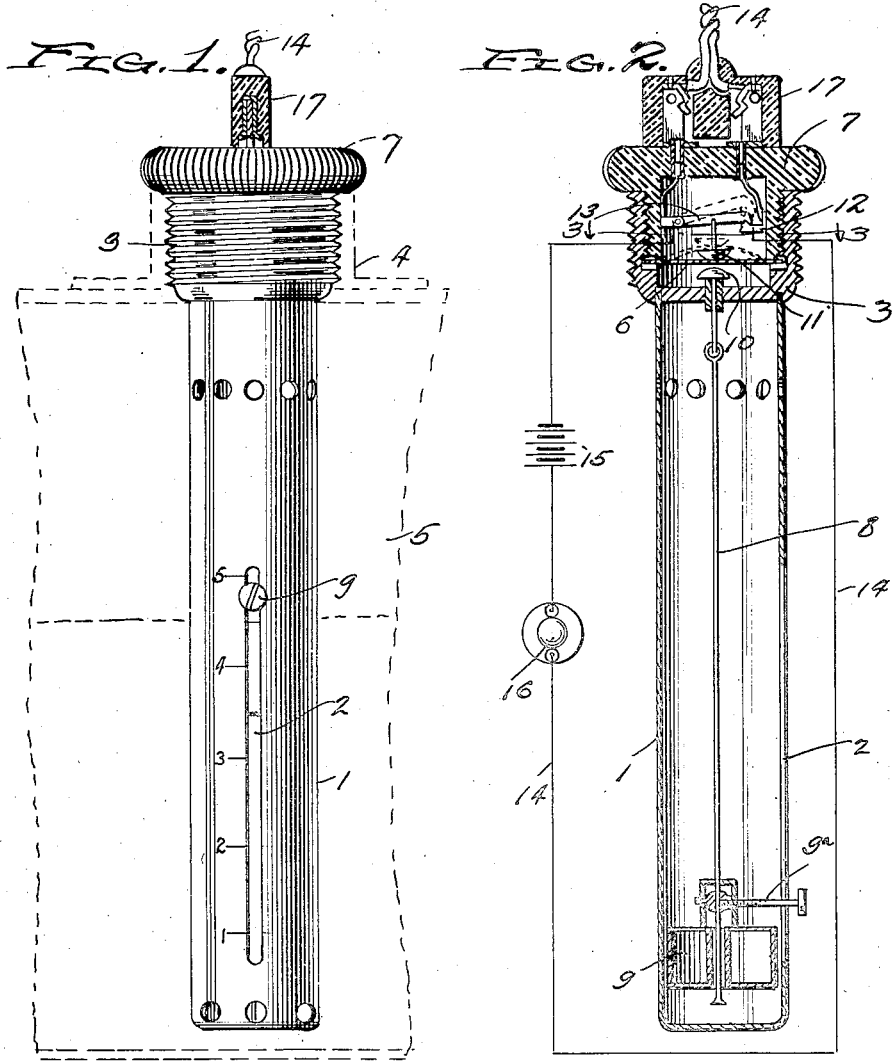

MAXCIMILIAAN CORNELIUS SPRANGERS, OF ROCHESTER, NEW YORK.

CIRCUIT-CLOSER FOR TANK-INDICATORS.

1,323,113.  Specification of Letters Patent.  Patented Nov. 25, 1919.

Application filed March 14, 1919. Serial No. 282,762.

*To all whom it may concern:*

Be it known that I, MAXCIMILIAAN C. SPRANGERS, a citizen of the United States, residing at Rochester, in the county of Monroe and State of New York, have invented certain new and useful Improvements in Circuit-Closers for Tank-Indicators, of which the following is a specification.

The invention is primarily designed to apprise the operator of a motor vehicle as to the quantity of gasolene or other fuel contained in the tank thereby preventing the complete consumption of the fuel to the inconvenience, annoyance and loss of time incident to the premature consumption of fuel.

The invention consists of a signal which is adapted to be automatically operated by the change of levels of the fuel in the supply tank, said signal being adjustable whereby it may be set to give warning when the tank contains any desired amount of gasolene or liquid fuel.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

In the drawing hereto attached,

Figure 1 is a view in elevation of a tank indicator embodying the invention, the dotted lines indicating portions of the fuel tank.

Fig. 2 is a sectional view indicating the signal and circuit in diagram.

Fig. 3 is a horizontal section on the line 3—3 of Fig. 2.

Corresponding and like parts are referred to in the following description and indicated in the several views of the drawing by like reference characters.

The device comprises a tube or receptacle 1 which is provided in a side with a longitudinal slot 2 and scale graduations at one side of the slot. A hollow fitting 3 is provided at the upper end of the tube or receptacle 1 and may be connected thereto in any manner or form a part thereof. The fitting 3 is exteriorly screw threaded to make connection with the collar 4 of the tank 5. A diaphragm 6 is supported within the fitting 3 upon an inner shoulder and is retained in place by the depending portion of a cap 7 which is preferably threaded within the upper portion of the fitting 3. The cap 7 is formed with a filled portion to enable the same to be firmly gripped when rotating the cap to screw it into or unscrew it from the fitting 3. A rod 8 is disposed within the tube or receptacle 1 and receives a float 9 which is adapted to be secured thereto in any adjusted position by means of a screw 9ª which extends through the slot 2 and which in conjunction with the scale graduations admits of the float being set to the required position. A button 10 is connected with the upper end of the rod 8 and is disposed to engage the underside of the diaphragm 6. A button 11 is disposed above the diaphragm 6 and rests thereon and is adapted to be moved upward when the center portion of the diaphragm 6 is pressed upward, as indicated by the dotted lines in Fig. 2. The diaphragm 6 occupies a position between the buttons 10 and 11 and so long as the tank contains an amount of fuel in excess of that required for operating the signal the button 10 will be held elevated so as to press the center portion of the diaphragm 6 upwardly and hold the circuit open, but when the level of the fuel in the tank reaches that for which the signal is set the circuit is closed and warning given that the fuel in the tank has reached the low point thereby enabling the operator to replenish the tank and prevent the latter from running dry without the knowledge of the operator.

Within the cap 7 is located two contacts 12 and 13 with which the wires 14 of an electric circuit are electrically connected. The contact 12 is fixed whereas the contact 13 is movable being pivoted and having connection with the button 11 so as to be operated thereby when the diaphragm 6 is pressed upward. The circuit 14 includes a battery 15 and a lamp 16 or other type of signal. The lamp 16 may be disposed so as to be under observation at all times and when lighted gives warning of the low condition of the fuel in the tank. A plug 17 to which the lead wires 14 are connected is adapted to be coupled to the cap 7 in any ordinary way.

The device is adapted to be introduced into the tank of a motor vehicle through the filling opening, the latter being closed by means of the fitting 3 which takes the place of the ordinary cap commonly provided for closing the tank. The float 9 is adjusted on the rod 8 and made secure by the fastening 9ª. When the tank contains sufficient fuel to buoy up the float 9, the button 10 is elevated and presses the center of the diaphragm 6 upwardly thereby lifting the button 11 and holding the contact 13 clear of the contact 12, as indicated by the dotted lines in Fig. 2 whereby the circuit is broken. When the level of the fuel in the tank reaches a point to permit the button 10 to fall away from the diaphragm 6, the latter member assuming a normal position admits of the button 11 lowering and the contact 13 to correspondingly move downward and engage the contact 12 whereby the circuit 14 is closed and the signal operated to give warning of the low condition of the fuel in the tank.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. A circuit closer comprising a tube, a hollow fitting at the upper end of the tube, a cap closing the fitting, a diaphragm clamped between the fitting and cap, a float controlled element mounted in the fitting below the diaphragm, a coacting element supported on the diaphragm and movable therewith and circuit closing contacts within the cap, one fixed and the other movable and actuated by the diaphragm through the element supported thereon.

2. A circuit closer comprising a tube, a hollow member at the upper end of the tube, a diaphragm within the hollow member, an element mounted in the member below the diaphragm, a float in the tube and connected with the said element, a coacting element supported on the diaphragm and fixed and movable contacts within the hollow member above the diaphragm, the movable contact being connected with the element supported upon the diaphragm.

3. A circuit closer comprising a tube having a slot in a side thereof, a rod within the tube, a float adjustable on the rod, means for securing the float on the rod in the required adjusted position and extending through the slot of the tube, a hollow fitting closing the upper end of the tube, an element loosely mounted in the fitting and connected with the said rod, a cap threaded to the fitting, a diaphragm clamped between the fitting and cap, an element supported on the diaphragm and movable therewith, a fixed contact within the cap and a movable contact adapted to be actuated by the diaphragm through the element supported thereon.

In testimony whereof I affix my signature in presence of two witnesses.

MAXCIMILIAAN CORNELIUS SPRANGERS.

Witnesses:
WILLIAM BERGER,
ARTHUR BERGER.